United States Patent
Raghavan et al.

(10) Patent No.: US 7,586,972 B2
(45) Date of Patent: Sep. 8, 2009

(54) CODE DIVISION MULTIPLE ACCESS ENHANCED CAPACITY SYSTEM

(75) Inventors: Srinivasa H. Raghavan, Rancho Palos Verdes, CA (US); Jack K. Holmes, Agoura Hills, CA (US); Kristine P. Maine, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 484 days.

(21) Appl. No.: 10/776,446

(22) Filed: Feb. 11, 2004

(65) Prior Publication Data

US 2004/0161019 A1   Aug. 19, 2004

(51) Int. Cl.
*H04B 1/00* (2006.01)
(52) U.S. Cl. .................. 375/130; 130/141; 130/205; 130/146; 130/147; 130/150; 370/320; 370/335; 370/342; 370/319; 370/330; 370/441; 370/347; 370/479; 342/150; 342/151; 342/152; 342/153; 342/154; 342/155; 333/193; 333/194; 333/195; 333/196
(58) Field of Classification Search ............... 375/130, 375/141, 205, 146, 147, 150; 370/320, 335, 370/342, 441, 479, 319, 330; 342/150, 151, 342/152, 153, 154, 155; 333/193, 194, 195, 333/196

See application file for complete search history.

(56) References Cited

U.S. PATENT DOCUMENTS

| 5,469,470 | A | * | 11/1995 | Takahashi | 375/142 |
| 6,075,810 | A | * | 6/2000 | Raghavan et al. | 375/130 |
| 7,023,900 | B2 | * | 4/2006 | Cleveland | 375/146 |
| 7,139,302 | B2 | * | 11/2006 | Raghavan et al. | 375/141 |
| 2004/0095989 | A1 | * | 5/2004 | Raghavan et al. | 375/141 |
| 2008/0175600 | A1 | * | 7/2008 | Shpantzer et al. | 398/191 |

* cited by examiner

*Primary Examiner*—Shuwang Liu
*Assistant Examiner*—Helene Tayong
(74) *Attorney, Agent, or Firm*—Derrick Michael Reid

(57) ABSTRACT

A code division multiple access (CDMA) communication system using spread spectrum signaling over a communication bandwidth uses two different signal spectra generated using two different respective spreading code formats, such as NRZ code formatting and staggered Manchester code formatting, for respectively providing nonsplit spectra having a center peak and split spectra having a center null. The spectra are combined during transmission as a CDMA communication signal having a composite spectrum. The use of different code formats produces the composite spectrum of respective center peak and center null spectra that enables increased channel capacity.

15 Claims, 4 Drawing Sheets

DUAL SPECTRUM CDMA TRANSMITTER

DUAL SPECTRUM CDMA TRANSMITTER

DUAL SPECTRUM CDMA RECEIVER

WAVEFORM COMPONENTS OF MANCHESTER
FORMATTED SIGNAL

WAVEFORM COMPONENTS OF STAGGERED
MANCHESTER FORMATTED SIGNAL

POWER SPECTRAL DENSITIES OF NRZ
AND MANCHESTER WAVEFORMS

CDMA CAPACITY VERSUS SNR MARGIN

US 7,586,972 B2

CODE DIVISION MULTIPLE ACCESS ENHANCED CAPACITY SYSTEM

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of code division multiple access communications systems. More particularly the present invention relates to concurrent code formatting of spreading codes in differing formats for use in code division multiple access communications systems for increased channel capacity.

BACKGROUND OF THE INVENTION

Code division multiple access (CDMA) communications have been used for some time. Typically, transmitted data is formatted and the spectrum is spread using CDMA spreading codes for communicating CDMA spread spectrum communication signals between a transmitter and a plurality of receivers within a null-to-null communications bandwidth. A transmitted signal includes superimposed spread spectrum signals spread by respective spreading codes for providing code division access to multiple receivers. Differing spreading codes provide signal code division multiplexing for enabling the respective receivers to acquire particular respective communication spread spectrum signals among all of the transmitted spread spectrum signals of the transmitted signal. The CDMA communication systems use a particular digital format to format a data stream prior to spectrum spreading and prior to transmission. The digital format is also applied to the spreading codes prior to spreading formatted data. One such digital format is the nonreturn to zero (NRZ) format. Another format is the Manchester format, also known as biphase-L. In an NRZ CDMA communication system, an NRZ format is used to format separate data streams into NRZ formatted data streams that are then spectrum spread by respective NRZ formatted CDMA spreading codes for transmission to respective receivers. The communication spectrum of an NRZ formatted and spread spectrum CDMA signal is characterized as having a center peak in the communications bandwidth. The communication spectrum is also referred to as a nonsplit spectrum. In a Manchester CDMA communication system, a Manchester format is used to format many separate data streams into Manchester formatted data streams that are then spectrum spread by respective Manchester formatted CDMA spreading codes for transmission to respective receivers. The communication spectrum of a Manchester formatted and spectrum spread CDMA signal is characterized as having a bandwidth center null of the communications bandwidth. This spectrum is also known as a split spectrum.

Typically, a CDMA system using NRZ formatting has a peak power spectral density at the center of the frequency band and is characterized as a nonsplit spectrum signal. A CDMA system using Manchester code formatting has a power spectral density null at the center of the frequency band and is characterized as a split spectrum signal. Another available digital format is the binary offset carrier format that also provides a split spectrum of a spread spectrum communication CDMA signal. Yet another digital format that provides a split spectrum of a spread spectrum communication CDMA signal is a staggered binary offset carrier format. The binary offset carrier format, the staggered binary offset carrier format and the staggered Manchester format are specific cases of the generalized Manchester format. Conventional CDMA communication systems typically use NRZ code formatting. However, CDMA communication systems can also be implemented using a split spectrum code format, such as the Manchester code digital format, staggered Manchester code format, the binary offset carrier digital format and the staggered binary offset carrier digital format. Manchester formats include all formats formatting an digital input stream and produces a digital waveform that has one for more transitions within a symbol time and that are centered about the center point of the symbol time, with a mean amplitude value of zero. For examples, Biphase-L has one centered transition, staggered Biphase-L has two symmetric transitions, binary offset carrier has more than one transition, and staggered binary offset carrier has more than two transitions.

An NRZ CDMA communication system may, for example, have an available bandwidth of 200 kHz and have a data rate of 400 bps. The spreading code chipping rate for the CDMA may be set at 100 kHz so that the null-to-null bandwidth for the spectrum spread CDMA signal is 200 kHz with a center peak. Channel capacity is the number of communication channels, that is, spread spectrum signals, which can be communicated within a given bandwidth. Using NRZ formatting, the channel capacity is about thirty-eight at a BER of $10^{-5}$. Channel capacity is a valuable resource. Increasing the channel capacity increases the number of users that can be served by a CDMA communication system. The NRZ, Manchester, staggered Manchester, binary offset carrier and staggered binary offset carrier formatted CDMA communication systems have limited channel capacities. These and other disadvantages are solved or reduced using the invention.

SUMMARY OF THE INVENTION

An object of the invention is to provide increased channel capacity in a code division multiple access communication system.

Another object of the invention is to provide increased channel capacity in a code division multiple access communication system using a plurality of digital formats.

Yet another object of the invention is to provide increased channel capacity in a code division multiple access communication system using spectrum spreading by a pair of digital code formats providing respective communication signal spectra.

Still another object of the invention is to provide increased channel capacity in a code division multiple access communication system using spectrum spreading by a pair of digital code formats respectively providing a communication signal spectrum with a center null and a communication signal spectrum with a center peak.

A further object of the invention is to provide increased channel capacity in a code division multiple access communication system using spectrum spreading with nonreturn to zero spreading code formatting producing a communication signal spectrum with a center peak, and with a generalized Manchester spreading code formatting producing a communication signal spectrum with a center null.

Yet a further object of the invention is to provide increased channel capacity in a code division multiple access communication system providing a composite communication spectrum produced by spectrum spreading with nonreturn to zero code formatting producing a nonreturn to zero communication spectrum having a center peak, and with a generalized Manchester code formatting producing a generalized Manchester communication spectrum with a center null.

The invention is directed to a code division multiple access communication (CDMA) system using spread spectrum signaling with at least two different code formats producing different respective communication signal spectra combined during transmission as a transmitted communication signal having a composite spectrum. A first group of data streams is spectrum spread by a first group of spreading codes formatted using a first digital code format. A second group of data streams is spectrum spread by a second group of spreading codes formatted by a second digital code format. The formatted data streams are spectrum spread by respective spread codes using two different code formats. In the preferred form, nonreturn to zero (NRZ) code formatting and a generalized Manchester code formatting are used on respective groups of spreading codes for communicating over respective communication channels. Using NRZ and a generalized Manchester code formatting, nonsplit and split spectra are produced and superimposed over the communications bandwidth.

In the broad form of the invention, those communications channels having spreading codes formatted by the first code format have a first communication signal spectrum, and those communication channels having spreading codes formatted by the second code format have a second communication signal spectrum. The first and second communication signal spectra of the transmitted communication signal are superimposed during transmitter modulation to provide a composite communication signal spectrum of the superimposed first and second communication signal spectra. Using the two different digital code formats for formatting the first and second groups of spreading codes produces two different communication signal spectra forming the composite communication signal spectrum that provides for increased channel capacity. These and other advantages will become more apparent from the following detailed description of the preferred embodiment.

DETAILED DESCRIPTION OF THE PREFERRED EMBODIMENT

Figure 1:
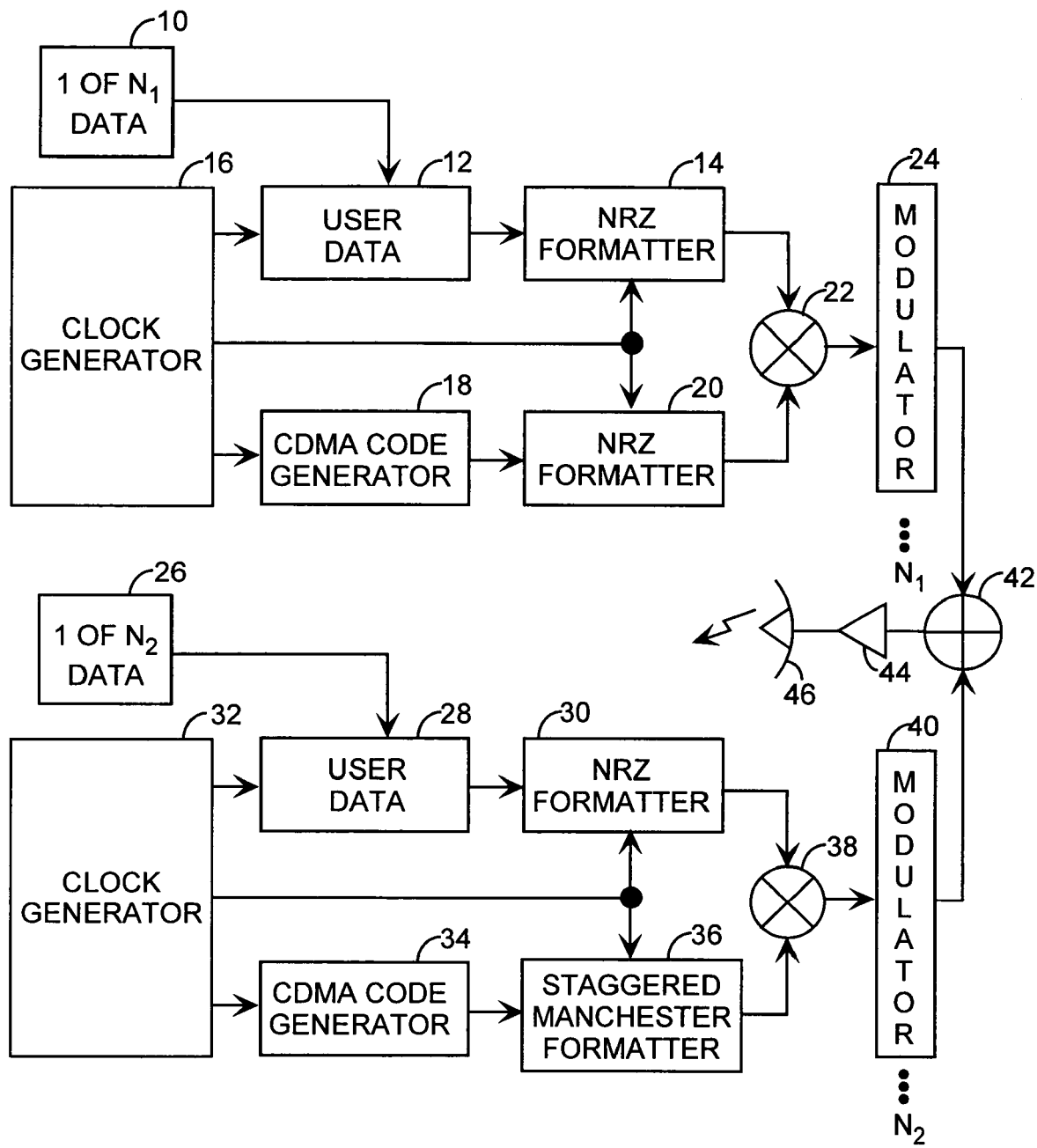
FIG. 1 is a block diagram of a dual spectrum code division multiple access (CDMA) transmitter.

An embodiment of the invention is described with reference to the figures using reference designations as shown in the figures. Referring to FIG. 1, a code division multiple access (CDMA) transmitter provides a transmitted communication signal having a dual spectrum over first and second sets of communications channels. The dual spectrum is considered as a composite spectrum having first and second spectra. In the preferred form, the first spectrum is a split spectrum having a center null in the communications bandwidth and the second spectrum is a nonsplit spectrum having a center peak in the communications bandwidth. The communication signal transmitted by the transmitter is a dual spectrum signal communicated over the null-to-null communications bandwidth.

The first set of communication channels communicate a first N1 set of data streams 10. A first data stream of the first set of N1 data streams of user data is clocked through a first shift register 12 for providing first shifted user data. The first shifted user data is nonreturn to zero (NRZ) formatted by a first NRZ data formatter 14 for providing first NRZ formatted data. A first clock generator 16 is used for providing a first data clock for clocking the first data stream through the first shift register 12 and through the NRZ data formatter 14. The clock generator 16 also provides a first code clock to a first CMDA code generator 18 for feeding a spreading code to a NRZ code formatter 20 for providing an NRZ spreading code. The NRZ formatted spreading code modulates the first NRZ formatted data using a first spreading mixer 22 for providing a NRZ spread spectrum signal to a first modulator 24.

For each of the data streams 10, there is a respective first shifter 12, first NRZ data formatter 14, first CDMA code generator 18, first NRZ code formatter 20, first spreading mixer 22, and first modulator 24, of a first communication channel in the first set of communication channels. The clock generator 16 communicates the first data clock signal to all of the first shifters 12 and all of the first NRZ data formatters 14, and communicates the first code clock signal to all of the first CDMA code generators 18 and the NRZ code formatters 20, for synchronized communications.

The second set of communication channels communicate a second N2 set of data streams 26. A second data stream of the second set of N2 data streams 26 of user data is clocked through a second shift register 28 for providing second shifted user data. The second shifted user data is also nonreturn to zero (NRZ) formatted by a second NRZ data formatter 30 for providing second NRZ formatted data. A second clock generator 32 is used for generating a second data clock for clocking the second data stream of the N2 data streams 26 through a second shift register 28 and through a second NRZ data formatter 30. The second clock generator 32 also provides a second code clock to a second CMDA code generator 34 for feeding a second spreading code to a staggered Manchester code formatter 36 for providing a staggered Manchester formatted spreading code. The staggered Manchester formatted spreading code modulates the second NRZ formatted data using a second spreading mixer 38 for providing a split spectrum spread signal to a second modulator 40.

For each of the N2 data streams 26, there is a respective second shifter 28, second NRZ data formatter 30, second CDMA code generator 34, staggered Manchester code formatter 36, second spreading mixer 38, and second modulator 40, of a second communication channel in the second set of communication channels. The second clock generator 32 communicates the second data clock signal to all of the second shifters 28 and to all of the second NRZ data formatters 30, and communicates a second code clock signal to all of the second CDMA code generators 34 and to all of the second staggered Manchester code formatters 36, for synchronized communications.

The first set of data streams 10 and second set of data streams 26 are processed through respective communication channels. However, each of the spreading codes of all of the channels is different for cochannel isolation. The clock generators 16 and 32 can be one clock generator for providing the same clock signals to the first and second sets of communications channels. Additionally, the first set of data streams 10 are data formatted and then modulated by NRZ formatted spreading codes from the first set NRZ code formatters 20, and the second set of data streams 26 are data formatted and then modulated by Manchester formatted spreading codes from the Manchester formatters 36. The first set of modulators 24 and the second set of modulators 40 provide respective NRZ spectrum spread signals and Manchester spectrum spread signals to a transmitter combiner 42 for combining the NRZ formatted spectrum spread signals and Manchester spectrum spread signals into a composite spectrum signals having a dual spectrum. The NRZ formatted spectrum is a nonsplit spectrum and the Manchester formatted spectrum is a split spectrum. Hence, the composite spectrum is a composite of a nonsplit spectrum resulting for NRZ code formatting and a split spectrum resulting from Manchester code formatting. The modulators 24 and 40 uniphase modulate a carrier signal having a carrier frequency. Uniphase modulation is defined as modulating one and only one phase on the carrier, which is either the inphase phase of the carrier or the quadrature phase of the carrier, but not both. The composite spread spectrum communication signal is a uniphase composite spread spectrum communication signal that is amplified by a high power amplifier 44 and transmitted as a dual spectrum communication signal using a transmitter antenna 46.

Figure 2:
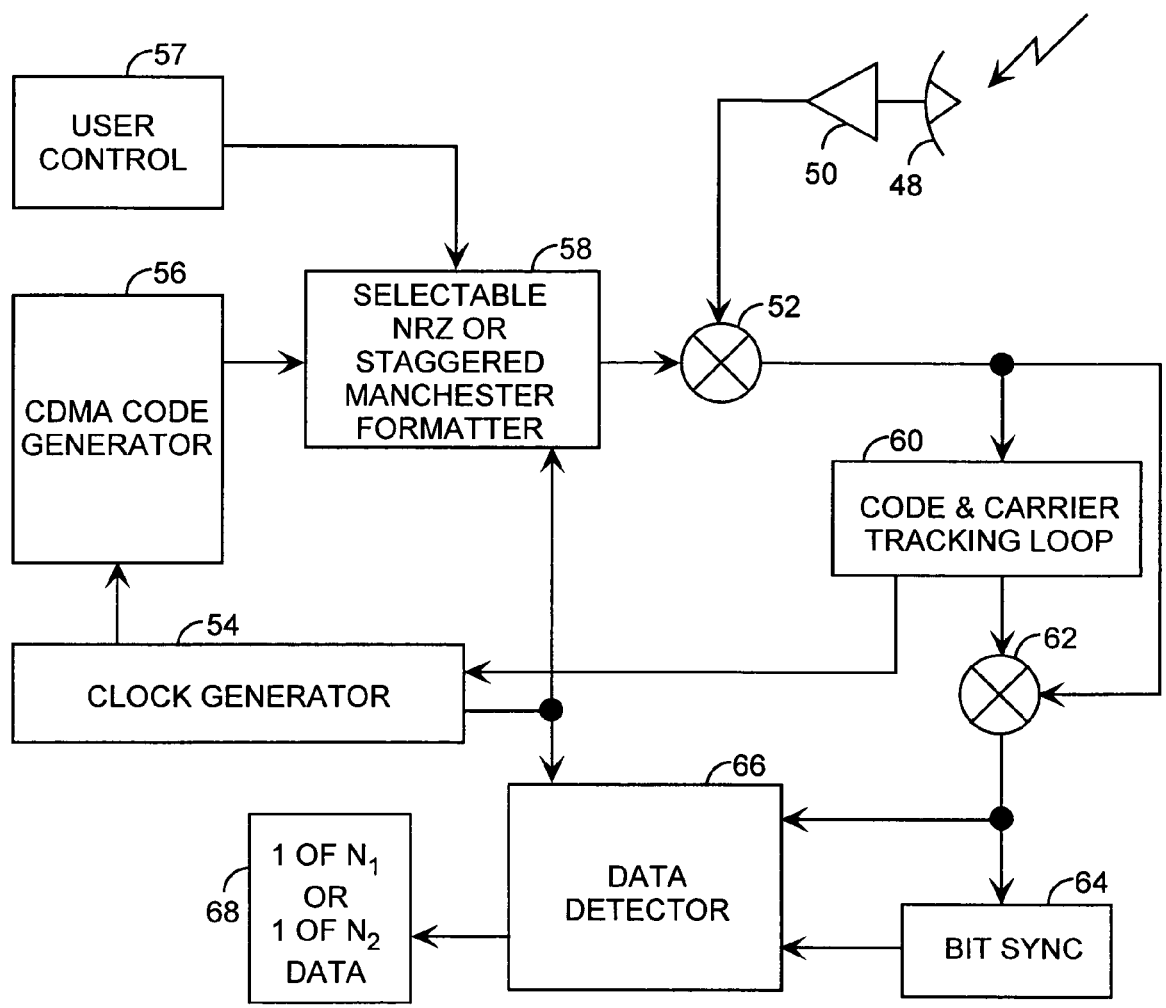
FIG. 2 is a block diagram of a dual spectrum CDMA receiver.

Referring to FIGS. 1 and 2, and more particularly to FIG. 2, a dual spectrum CDMA receiver receives the split and nonsplit composite spectrum communication signal as a received communication signal using a receiver antenna 48. The received communication signal is amplified by a low noise amplifier 50 and spectrum despread by a despreading mixer 52. A clock generator 54 is used for providing a receiver clock signal. The clock generator 54 generates a receiver code clock signal matching the code clock signal generated in the transmitter. The clock generator 54 also generates data clock signals for formatting and data detection. In one form of the invention, a user control 57 is used for selecting the type of code formatting. In the preferred form, NRZ and staggered Manchester code formatting is respectively used for formatting the first and second sets of spreading codes. For a particular channel, and hence, for a particular CDMA code, the received communication signal is despread using a spreading code formatter corresponding to one of the NRZ or staggered Manchester code formatters 20 or 36 used to spectrum spread one of the formatted data streams 10 or 26 in the transmitter. The user control 57 controls the selection of the code format. A selectable NRZ or staggered Manchester formatter 58 is selectable to be either an NRZ code formatter or a staggered Manchester code formatter and is clocked using the code clock signal from the clock generator 54.

A receiver CDMA code generator 56 generates a replica spreading code for the respective communication channel. The replica spreading code and the code formatter 58 in the receiver are identical to the spreading code and the code formatter used in the transmitter for the same communication channel. The CDMA code generator 56 generates a CDMA code that is fed to the receiver code formatter 58 for providing a formatted code to the despreading mixer 52 that then despreads the communication signal for providing a despread signal. The despread signal is communicated to a conventional code and carrier tracking loop 60. The code tracking loop 60 provides a clock error signal to the clock generator 54 for adjusting clock timing for the despreading code for maintaining code tracking. The carrier tracking loop 60 provides a carrier replica to a carrier demodulator 62 for demodulating the despread communication signal into a carrier demodulated data stream. The carrier demodulated data stream from carrier demodulator 62 is fed to a bit synchronizer 64 generating a bit timing signal that is fed to a data detector 66 for synchronized clocking of the demodulated data stream into a replica data stream 68. Bit timing may also be generated from the tracking loop 60. The data clock signal from the clock generator 54 is received by the data detector 66 for synchronizing the replica data stream 68. The replica data stream 68 is a replica of the data stream 10 or 26 spectrum spread by the spreading code. In this manner, the receiver can be used to receive either an NRZ or a staggered Manchester code formatted CDMA signal of the composite communication signal respectively having either a nonsplit spectrum or a split spectrum.

The preferred form of the receiver is a code format selectable receiver. The transmitter can be adapted to change the code format for a respective channel by feeding a data stream into either an NRZ or staggered Manchester code formatted communication channel. However, it should be apparent that the receiver could be a fixed code format receiver using either NRZ or staggered Manchester code formatting, but not both, without the use of the user control 57, and without a selectable formatter 58. The formatter 58 is then either a fixed NRZ or a fixed staggered Manchester code formatter. In either case, the data streams can have the same data formatting, such as NRZ data formatting by NRZ data formatters 14 and 30.

Figure 3:
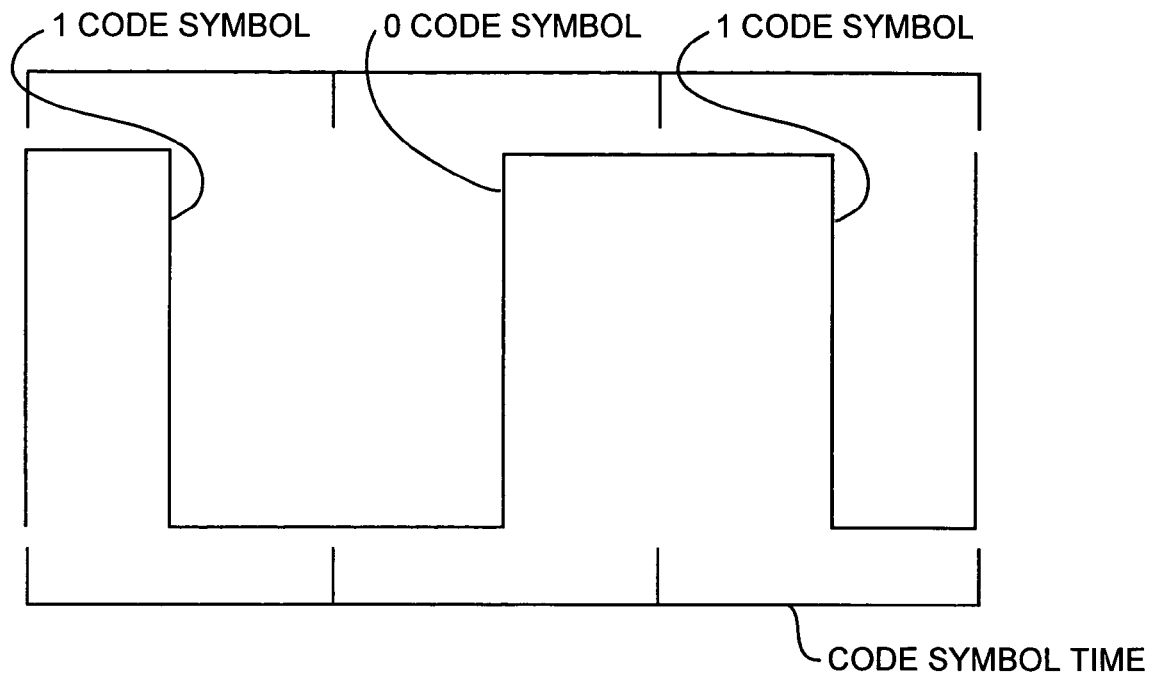
FIG. 3 is a graph of the waveform components of the Manchester formatted signal.
Figure 4:
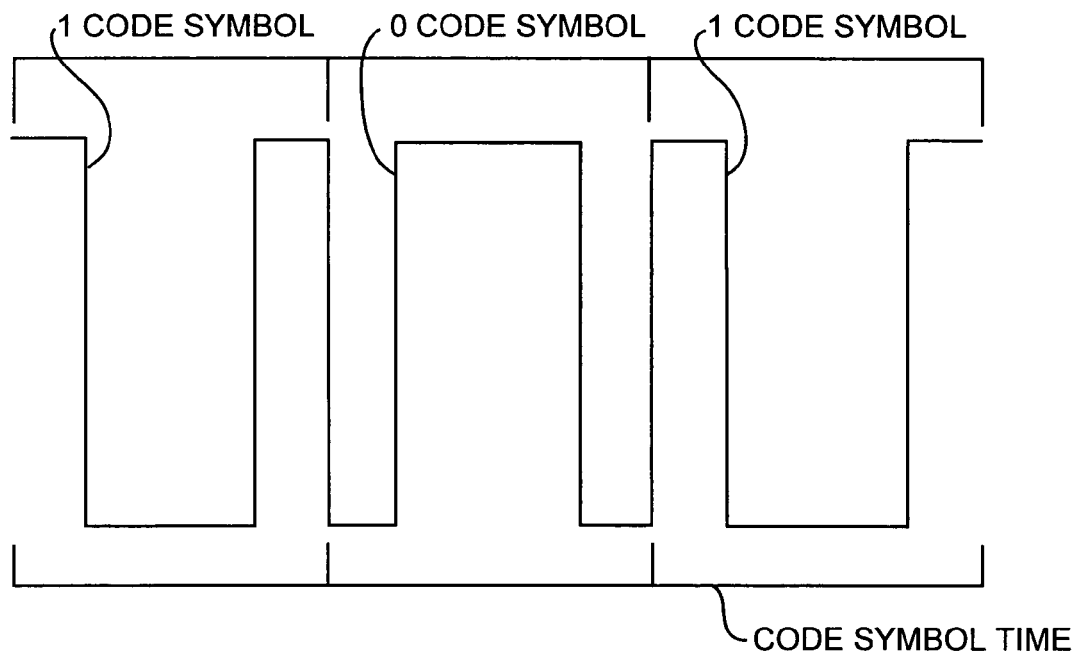
FIG. 4 is a graph of the waveform components of the staggered Manchester formatted signal.

Referring to FIGS. 3 and 4, Manchester and staggered Manchester code symbol waveforms are respectively shown for showing that the staggered Manchester code symbol waveform is a replica of the original Manchester code symbol waveform but staggered, that is, shifted, in time by a quarter of the code symbol time $\tau$. The staggered Manchester code formatting is done by staggering the underlying square wave signal by a quarter of the square wave cycle compared to the underlying square wave of the Manchester formatted code signal. As a result of this staggering, the first quarter of the square symbol gets moved to the last quarter of the square wave symbol as shown in the FIG. 4. It can also be seen from this figure that the antisymmetry in the waveform shape between the first and the second half of the code symbol with a Manchester code format is changed in the case of staggered Manchester code format to a symmetrical relationship between the two halves of the code symbol waveform.

Figure 5:
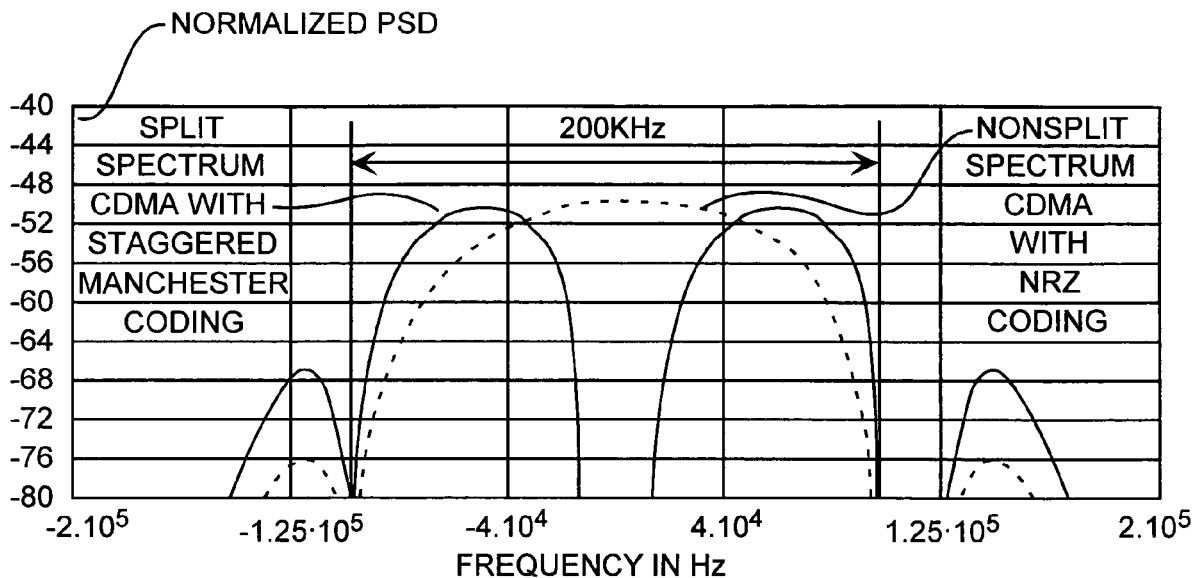
FIG. 5 is a graph of the power spectral densities of communication spectra using nonreturn to zero (NRZ) formatting and staggered Manchester formatting.
Figure 6:
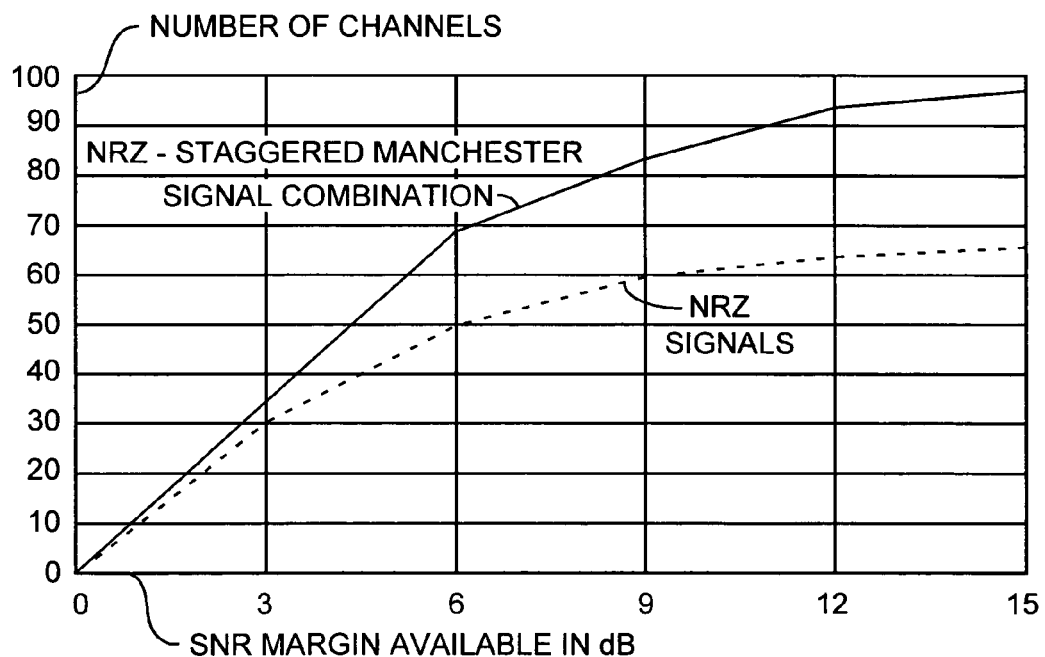
FIG. 6 is a graph of the CDMA channel capacity as a function of the signal to noise (SNR) margin.

Referring to all other Figures and more particularly to FIGS. 5 and 6, the communication channel signals using NRZ code formatting or staggered Manchester code formatting have respective nonsplit and split spectra occupying the same null-to-null communication bandwidth, that may be, for example, 200 kHz with a data rate of 400 bps. The code chipping rate for the NRZ code formatter in a CDMA system may be a 100 kHz chipping rate for providing the null-to-null bandwidth for the NRZ code formatted CDMA signal. With only NRZ code formatted CDMA signaling, the capacity of fifty CDMA channels is achieved with an available link margin of 6.0 dB at a BER of $10^{-5}$. Under the same conditions, but with added staggered Manchester code format signaling at 50.0 kHz, for producing a dual spectrum CDMA signal, the overall channel capacity is increased. The communication channel has overlapping nonsplit and split spectra respectively provided by the NRZ code formatting and staggered Manchester code formatting. The total channel capacity is the sum of the NRZ code formatted channels and the staggered Manchester code formatted channels. The sum total is improved to sixty nine channels, which is a 38% improvement in the channel capacity over a conventional CDMA system using only NRZ code formatting generating a nonsplit spectrum.

Power spectral densities for the NRZ and staggered Manchester code formatted signals, filtered with a 6th order Butterworth filter have a cutoff of 100 kHz, as is shown in FIG. 5. A 19% to 48% capacity improvement is practicable using a combination of NRZ code formatting and staggered Manchester code formatting within a given frequency bandwidth for link margins of 3-12 dB. With a modest increase in CDMA system complexity, a CDMA system can obtain increased channel capacity using different code formatters for providing different overlapping power spectral densities within the null-to-null communication bandwidth. In the preferred form, NRZ code formatting generates nonsplit spectra, and, staggered Manchester code formatting generates split spectra of the dual spectrum CDMA communication signal.

The present invention is directed to a dual spectrum CDMA communication system using two different code formats for providing respective spectra overlapping within a communication bandwidth. The respective spectra share the same bandwidth with minimal cross interference due to one spectrum having a center peak and the other spectrum having peaks away from the center, for effective bandwidth sharing within the same communications bandwidth. The dual spectrum CDMA communication system offers increased channel capacity. It should now be apparent that a mix of transmitters and receivers could operate as part of a complete communication system communicating both split and nonsplit spectrum signals. For example, one group of transmitters or satellites could transmit split spectrum signals while another group of transmitters or satellites could transmit nonsplit spectrum signals, all of the signals communicating within the same CDMA communications bandwidth. Those skilled in the art can make enhancements, improvements, and modifications to the invention, and these enhancements, improvements, and modifications may nonetheless fall within the spirit and scope of the following claims.

What is claimed is:

1. A system for communicating a first formatted data stream and a second formatted data stream through a dual spectrum signal over a communication bandwidth, the system comprising,
    a first code formatter for formatting a first spreading code into a first formatted code,
    a first spreader for spectrum spreading the first formatted data stream by the first formatted code into a first spread spectrum signal,
    a second code formatter for formatting a second spreading code into a second formatted code,
    a second spreader for spectrum spreading the second formatted data stream by the second formatted code into a second spread spectrum signal, and
    a modulator for combining and communicating the first spread spectrum signal and the second spread spectrum signal into the dual spectrum signal, the first spread spectrum signal having a first spectrum over the communication bandwidth and the second spread spectrum signal having a second spectrum over the communication bandwidth, the first spread spectrum signal and the second spread spectrum signal respectively uniphase modulating a carrier, the dual spectrum signal being a uniphase dual spectrum signal,
    wherein,
    the first code formatter is an NRZ code formatter, and
    the second code formatter is a staggered Manchester code formatter.

2. The system of claim 1 wherein,
    the first spectrum is a nonsplit spectrum with a peak within the communication bandwidth, and
    the second spectrum is a split spectrum with a null within the communication bandwidth.

3. The system of claim 1 wherein the system is a code division multiple access system.

4. The system of claim 1 having a first receiver for spread spectrum despreading the first spread spectrum signal and the second spread spectrum signal, the first receiver comprising,
    a first replica code formatter for formatting a first replica spreading code into a first replica formatted code, the first replica spreading code being a replica of the first spreading code, and
    a first despreader for spectrum despreading the first spread spectrum signal by the first replica formatted code into a first despread signal.

5. The system of claim 1 having a second receiver for spread spectrum despreading the second spread spectrum signal and the second spread spectrum signal, the second receiver comprising,
    a second replica code formatter for formatting a second replica spreading code into a second replica formatted code, the second replica spreading code being a replica of the second spreading code, and
    a second despreader for spectrum despreading the second spread spectrum signal into a second despread signal.

6. The system of claim 1 further having a first receiver and a second receiver,
    the first receiver comprising,
    a first replica code formatter for formatting a first replica spreading code into a first replica formatted code, the first replica spreading code being a replica of the first spreading code, and
    a first despreader for spectrum despreading the first spread spectrum signal into a first despread signal, and
    a detector for detecting the first formatted data stream for the first despread signal, and
    the second receiver comprising,
    a second replica code formatter for formatting a second replica spreading code into a second replica formatted code, the second replica spreading code being a replica of the second spreading code, and
    a second despreader for spectrum despreading the second spread spectrum signal by the second replica formatted code into a second despread signal.

7. The system of claim 1 further comprising,
    a first replica code formatter for formatting a first replica spreading code into a first replica formatted code, the first replica spreading code being a replica of the first spreading code,
    a first despreader for spectrum despreading the first spread spectrum signal into a first despread signal,
    a second replica code formatter for formatting a second replica spreading code into a second replica formatted code, the second replica spreading code being a replica of the second spreading code, and
    a second despreader for spectrum despreading the second spread spectrum signal into a second despread signal,
    wherein,
    the first code formatter is an NRZ formatter,
    the first spread spectrum signal is a nonsplit spectrum signal,
    the first spectrum is a nonsplit spectrum having a center peak,
    the second code formatter is a staggered Manchester formatter,
    the second spread spectrum signal is a split spectrum signal, the second spectrum is a split spectrum having a center null, the first replica code formatter is an NRZ formatter, and the second replica code formatter is a staggered Manchester code formatter.

8. The system of claim 1 further comprising, a first replica code formatter for formatting a first replica spreading code into a first replica formatted code, the first replica spreading code being a replica of the first spreading code, a first despreader for spectrum despreading the first spread spectrum signal into a first despread signal, a second replica code formatter for formatting a second replica spreading code into a second replica formatted code, the second replica spreading code being a replica of the second spreading code, and a second despreader for spectrum despreading the second spread spectrum signal into a second despread signal, wherein, the first code formatter is in a transmitter, the first spread spectrum signal is a nonsplit spectrum signal, the second code formatter is in the transmitter, the second spread spectrum signal is a split spectrum signal, the first replica code formatter is in a first receiver, the second replica code formatter is in a second receiver, the first formatted data stream is communicated between the transmitter and the first receiver, and the second formatted data stream is communicated between the transmitter and the second receiver.

9. The system of claim 1 further comprising, a first replica code formatter for formatting a first replica spreading code into a first replica formatted code, the first replica spreading code being a replica of the first spreading code, a first despreader for spectrum despreading the first spread spectrum signal into a first despread signal, a second replica code formatter for formatting a second replica spreading code into a second replica formatted code, the second replica spreading code being a replica of the second spreading code, and a second despreader for spectrum despreading the second spread spectrum signal into a second despread signal, wherein, the first code formatter is an NRZ formatter, the first spread spectrum signal is a nonsplit spectrum signal, the second code formatter is a staggered Manchester formatter, the second spread spectrum signal is a split spectrum signal, the first replica code formatter is an NRZ formatter, the second replica code formatter is a staggered Manchester code formatter, the first code formatter and the second code formatter are disposed in a transmitter.

10. The system of claim 1 wherein, the staggered Manchester format is a staggered Biphase-L format.

11. The system of claim 1 wherein, the staggered Manchester format is a staggered binary offset carrier format.

12. A system for communicating a first formatted data stream and a second formatted data stream through a dual spectrum signal over a communication bandwidth, the system comprising, a first code formatter for formatting a first spreading code into a first formatted code, a first spreader for spectrum spreading the first formatted data stream by the first formatted code into a first spread spectrum signal, a second code formatter for formatting a second spreading code into a second formatted code, a second spreader for spectrum spreading the second formatted data stream by the second formatted code into a second spread spectrum signal, and a modulator for combining and communicating the first spread spectrum signal and the second spread spectrum signal into the dual spectrum signal, the first spread spectrum signal having a first spectrum over the communication bandwidth and the second spread spectrum signal having a second spectrum over the communication bandwidth, the first spread spectrum signal and the second spread spectrum signal respectively modulating only one phase of a carrier, the dual spectrum signal being a uniphase dual spectrum signal, wherein, the first code formatter is an NRZ code formatter, the second code formatter is a staggered Manchester code formatter, the uniphase modulation of the carrier being defined as modulating one phase of the carrier by one single signal being the first spread spectrum signal into a first uniphase modulated signal, the uniphase modulation of the carrier being defined as modulating one phase of the carrier by one single signal being the second spread spectrum signal into a second uniphase modulated signal, and the dual spectrum signal being a combination of the first uniphase modulated signal and the second uniphase modulated signal when combined, the first uniphase modulated signal and the second uniphase modulated signal both modulating only one phase of the carrier.

13. The system of claim 12 wherein, the first code formatter is an NRZ code formatter, and the second code formatter is a staggered Manchester code formatter.

14. A system for communicating a first formatted data stream and a second formatted data stream through a dual spectrum signal over a communication bandwidth, the system comprising, a first code formatter for formatting a first spreading code into a first formatted code, a first spreader for spectrum spreading the first formatted data stream by the first formatted code into a first spread spectrum signal, a second code formatter for formatting a second spreading code into a second formatted code, a second spreader for spectrum spreading the second formatted data stream by the second formatted code into a second spread spectrum signal, and a modulator for modulating only one phase of the carrier by only the first spread spectrum signal for providing a first modulated signal and for modulating the same phase of the carrier by only the second spread spectrum signal for providing a second modulated signals, and a combiner for combining the first modulated signal and the second modulated signal into the dual spectrum signal, the dual spectrum signal being a carrier modulated signal having only one carrier phase modulated, the first modulated signal from the first spread spectrum signal having a first spectrum over the communication bandwidth, the second modulated signal from second spread spectrum signal having a second spectrum over the communication bandwidth.

15. The system of claim 14 wherein,
the first code formatter is an NRZ code formatter, and
the second code formatter is a staggered Manchester code formatter.

* * * * *